United States Patent
Bird (10) Patent No.: US 9,945,185 B2
(45) Date of Patent: Apr. 17, 2018

(54) METHODS OF FORMING POLYCRYSTALLINE DIAMOND

(71) Applicant: Baker Hughes Incorporated, Houston, TX (US)

(72) Inventor: Marc W. Bird, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 613 days.

(21) Appl. No.: 14/291,862

(22) Filed: May 30, 2014

(65) Prior Publication Data

US 2015/0345229 A1  Dec. 3, 2015

(51) Int. Cl.
| | |
|---|---|
| *E21B 10/567* | (2006.01) |
| *B24D 18/00* | (2006.01) |
| *B24D 99/00* | (2010.01) |
| *E21B 10/55* | (2006.01) |

(52) U.S. Cl.
CPC ........ *E21B 10/567* (2013.01); *B24D 18/0009* (2013.01); *B24D 99/005* (2013.01); *E21B 10/55* (2013.01)

(58) Field of Classification Search
None
See application file for complete search history.

(56) References Cited

U.S. PATENT DOCUMENTS

| | | | |
|---|---|---|---|
| 3,030,187 A * | 4/1962 | Eversole | B01J 3/062 423/446 |
| 3,816,085 A | 6/1974 | Hall | |
| 3,913,280 A | 10/1975 | Hall | |
| 4,224,380 A | 9/1980 | Bovenkerk et al. | |
| 4,288,248 A | 9/1981 | Bovenkerk et al. | |
| 4,871,377 A | 10/1989 | Frushour | |
| 4,944,772 A | 7/1990 | Cho | |
| 5,127,923 A | 7/1992 | Bunting et al. | |
| 6,544,308 B2 | 4/2003 | Griffin et al. | |

(Continued)

FOREIGN PATENT DOCUMENTS

| | | |
|---|---|---|
| KR | 1020050083576 A | 8/2005 |
| WO | 2013015348 A1 | 1/2013 |
| WO | 2013069711 A1 | 5/2013 |

OTHER PUBLICATIONS

International Search Report for International Application No. PCT/US2015/033223, dated Aug. 21, 2015, 3 pages.

(Continued)

*Primary Examiner* — Guinever S Gregorio
(74) *Attorney, Agent, or Firm* — TraskBritt (57) ABSTRACT

A method of forming polycrystalline diamond includes encapsulating diamond particles, carbon monoxide, and carbon dioxide in a container. The encapsulated diamond particles, carbon monoxide, and carbon dioxide are subjected to a pressure of at least 4.5 GPa and a temperature of at least 1400° C. to form inter-granular bonds between the diamond particles. A cutting element includes polycrystalline diamond material comprising inter-bonded grains of diamond. The polycrystalline diamond material is substantially free of graphitic carbon and metallic compounds. The polycrystalline diamond material exhibits a density of at least about 3.49 g/cm$^3$ and a modulus of at least about 1000 GPa. An earth-boring tool may include such a cutting element secured to a body.

20 Claims, 5 Drawing Sheets

(56) References Cited

U.S. PATENT DOCUMENTS

| | | | |
|---|---|---|---|
| 6,562,462 | B2 | 5/2003 | Griffin et al. |
| 8,485,284 | B2 | 7/2013 | Sithebe |
| 2004/0033188 | A1 | 2/2004 | Yamanaka et al. |
| 2012/0055716 | A1 | 3/2012 | Martensson et al. |
| 2013/0068540 | A1* | 3/2013 | DiGiovanni ....... B24D 18/0009 |
| | | | 175/434 |

OTHER PUBLICATIONS

Written Opinion of the International Searching Authority for International Application No. PCT/US2015/033223, dated Aug. 21, 2015, 8 pages.

International Preliminary Report on Patentability for International Application No. PCT/US2015/033223 dated Dec. 6, 2016, 9 pages.

\* cited by examiner

METHODS OF FORMING POLYCRYSTALLINE DIAMOND

FIELD

Embodiments of the present disclosure relate generally to methods of forming polycrystalline diamond material, to cutting elements including polycrystalline diamond material, and to earth-boring tools for drilling subterranean formations including such cutting elements.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits include cones that are mounted on bearing pins extending from legs of a bit body such that each cone is capable of rotating about the bearing pin on which the cone is mounted. A plurality of cutting elements may be mounted to each cone of the drill bit.

The cutting elements used in earth-boring tools often include polycrystalline diamond cutters (often referred to as "PDCs"), which are cutting elements that include a polycrystalline diamond (PCD) material. Such polycrystalline diamond cutting elements are foamed by sintering and bonding together relatively small diamond grains or crystals under conditions of high temperature and high pressure, typically in the presence of a catalyst (such as cobalt, iron, nickel, or alloys and mixtures thereof), to form a layer of polycrystalline diamond material on a cutting element substrate. These processes are often referred to as high pressure/high temperature (or "HPHT") processes. Catalyst material is mixed with the diamond grains to reduce the amount of oxidation of diamond by oxygen and carbon dioxide during an HPHT process and to promote diamond-to-diamond bonding.

The cutting element substrate may comprise a cermet material (i.e., a ceramic-metal composite material) such as cobalt-cemented tungsten carbide. In such instances, the cobalt (or other catalyst material) in the cutting element substrate may be drawn into the diamond grains or crystals during sintering and serve as a catalyst material for forming a diamond table from the diamond grains or crystals. In other methods, powdered catalyst material may be mixed with the diamond grains or crystals prior to sintering the grains or crystals together in an HPHT process.

Upon formation of a diamond table using an HPHT process, catalyst material may remain in interstitial spaces between the grains or crystals of diamond in the resulting polycrystalline diamond table. The presence of the catalyst material in the diamond table may contribute to thermal damage in the diamond table when the cutting element is heated during use, due to friction at the contact point between the cutting element and the formation. Polycrystalline diamond cutting elements in which the catalyst material remains in the diamond table are generally thermally stable up to temperatures of about 750° C., although internal stress within the polycrystalline diamond table may begin to develop at temperatures exceeding about 350° C. This internal stress is at least partially due to differences in the rates of thermal expansion between the diamond table and the cutting element substrate to which it is bonded. This differential in thermal expansion rates may result in relatively large compressive and tensile stresses at the interface between the diamond table and the substrate, and may cause the diamond table to delaminate from the substrate. At temperatures of about 750° C. and above, stresses within the diamond table may increase significantly due to differences in the coefficients of thermal expansion of the diamond material and the catalyst material within the diamond table itself. For example, cobalt thermally expands significantly faster than diamond, which may cause cracks to form and propagate within a diamond table including cobalt, eventually leading to deterioration of the diamond table and ineffectiveness of the cutting element. Furthermore, catalyst material may allow diamond within the diamond table to be converted to graphite, which may be referred to in the art as "reverse graphitization."

To reduce the problems associated with different rates of thermal expansion and with reverse graphitization in polycrystalline diamond cutting elements, so-called "thermally stable" polycrystalline diamond (TSD) cutting elements have been developed. A thermally stable polycrystalline diamond cutting element may be formed by leaching the catalyst material (e.g., cobalt) out from interstitial spaces between the diamond grains in the diamond table using, for example, an acid. Substantially all of the catalyst material may be removed from the diamond table, or only a portion may be removed. Thermally stable polycrystalline diamond cutting elements in which substantially all catalyst material has been leached from the diamond table have been reported to be thermally stable up to temperatures of about 1200° C. It has also been reported, however, that fully leached diamond tables are relatively more brittle and vulnerable to shear, compressive, and tensile stresses than are non-leached diamond tables. In an effort to provide cutting elements having diamond tables that are more thermally stable relative to non-leached diamond tables, but that are also relatively less brittle and vulnerable to shear, compressive, and tensile stresses relative to fully leached diamond tables, cutting elements have been provided that include a diamond table in which only a portion of the catalyst material has been leached from the diamond table.

BRIEF SUMMARY

In some embodiments, a method of forming polycrystalline diamond includes encapsulating diamond particles, carbon monoxide, and carbon dioxide in a container. The encapsulated diamond particles, carbon monoxide, and carbon dioxide are subjected to a pressure of at least 4.5 GPa and a temperature of at least 1400° C. to form inter-granular bonds between the diamond particles.

In other embodiments, a cutting element for use in an earth boring tool may include a polycrystalline diamond material formed by a method comprising encapsulating diamond particles, carbon monoxide, and carbon dioxide in a container. The encapsulated diamond particles, carbon monoxide, and carbon dioxide may be subjected to a pressure of at least 4.5 GPa and a temperature of at least 1400° C. to form inter-granular bonds between the diamond particles.

In certain embodiments, a cutting element includes polycrystalline diamond material comprising inter-bonded grains of diamond. The polycrystalline diamond material is substantially free of graphitic carbon and metallic compounds. The polycrystalline diamond material exhibits a density of at least about 3.49 g/cm³ and a modulus of at least about 1000 GPa. An earth-boring tool may include such a cutting element secured to a body.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not meant to be actual views of any particular material, apparatus, system, or method, but are merely idealized representations which are employed to describe certain embodiments of the present invention. For clarity in description, various features and elements common among the embodiments of the invention may be referenced with the same or similar reference numerals.

Figure 1:
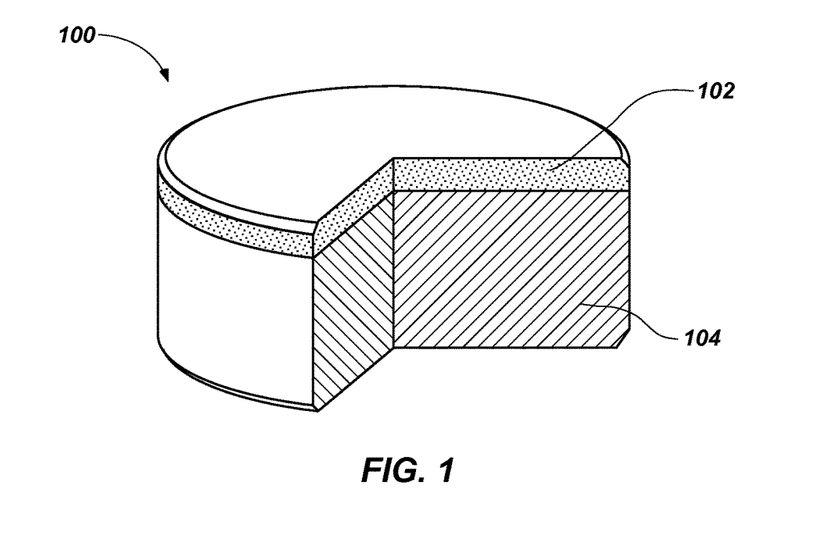
FIG. 1 is a partially cut-away perspective view of an embodiment of a cutting element including a volume of polycrystalline diamond on a substrate.

FIG. 1 illustrates a cutting element 100, which may be formed in accordance with embodiments of methods as disclosed herein. The cutting element 100 includes polycrystalline diamond 102. Optionally, the cutting element 100 also may include a substrate 104 to which the polycrystalline diamond 102 may be bonded. For example, the substrate 104 may include a generally cylindrical body of cobalt-cemented tungsten carbide material, although substrates of different geometries and compositions also may be employed. The polycrystalline diamond 102 may be in the form of a table (i.e., a layer) of polycrystalline diamond 102 on the substrate 104, as shown in FIG. 1. The polycrystalline diamond 102 may be provided on (e.g., formed on or secured to) a surface of the substrate 104. In additional embodiments, the cutting element 100 may simply comprise a volume of the polycrystalline diamond 102 having any desirable shape, and may not include any substrate 104.

Figure 2:
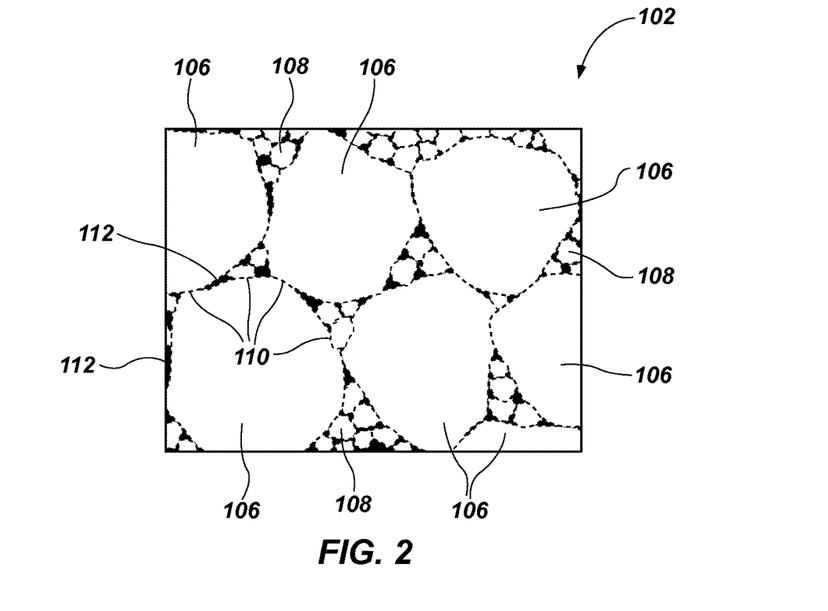
FIG. 2 is a simplified view illustrating how a microstructure of the polycrystalline diamond of the cutting element of FIG. 1 may appear under magnification.

As shown in FIG. 2, the polycrystalline diamond 102 may include interspersed and inter-bonded diamond grains that form a three-dimensional network of diamond material. Optionally, in some embodiments, the diamond grains of the polycrystalline diamond 102 may have a multimodal grain size distribution. For example, the polycrystalline diamond 102 may include larger diamond grains 106 and smaller diamond grains 108. The larger diamond grains 106 and/or the smaller diamond grains 108 may have average particle dimensions (e.g., mean diameters) of less than 1 mm, less than 0.1 mm, less than 0.01 mm, less than 1 μm, less than 0.1 μm, or even less than 0.01 μm. That is, the larger diamond grains 106 and smaller diamond grains 108 may each include micron diamond particles (diamond grains in a range from about 1 μm to about 500 μm (0.5 mm)), submicron diamond particles (diamond grains in a range from about 500 nm (0.5 μm) to about 1 μm), and/or diamond nanoparticles (particles having an average particle diameter of about 500 nm or less). In some embodiments, the larger diamond grains 106 may be micron diamond particles, and the smaller diamond grains 108 may be submicron diamond particles or diamond nanoparticles. In some embodiments, the larger diamond grains 106 may be submicron diamond particles, and the smaller diamond grains 108 may be diamond nanoparticles. In other embodiments, the diamond grains of the polycrystalline diamond 102 may have a monomodal grain size distribution. The direct diamond-to-diamond inter-granular bonds between the diamond grains 106, 108 are represented in FIG. 2 by dashed lines 110. Interstitial spaces 112 (shaded black in FIG. 2) are present between the inter-bonded diamond grains 106, 108 of the polycrystalline diamond 102. These interstitial spaces 112 may include empty voids within the polycrystalline diamond 102 in which there is no solid or liquid substance (although a gas, such as air, may be present in the voids).

Embodiments of methods disclosed herein may be used to form the polycrystalline diamond 102, and may result in improved inter-granular diamond-to-diamond bonding between the diamond grains 106, 108 in the polycrystalline diamond 102. In some embodiments, the polycrystalline diamond 102 may be formed by encapsulating diamond grains 106, 108 and a gas including carbon monoxide, carbon dioxide, and optionally, an inert gas, in a container and subjecting the encapsulated diamond grains 106, 108 and gas to HPHT conditions (e.g., a pressure of at least 4.5 GPa and a temperature of at least 1400° C.) to form the direct diamond-to-diamond inter-granular bonds between the diamond grains 106, 108 and form the polycrystalline diamond 102. Such a process is described below with reference to FIG. 3.

Figure 3:
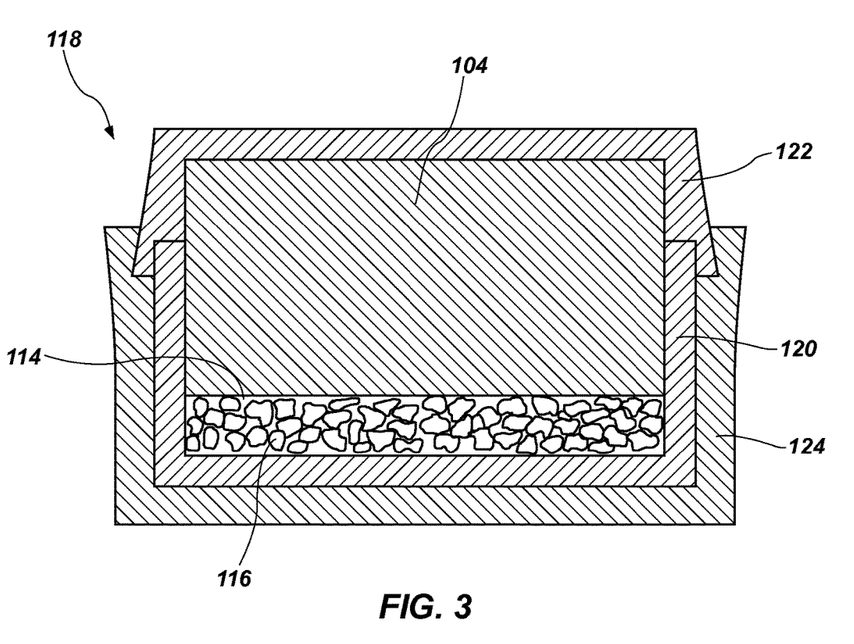
FIG. 3 is a simplified cross-sectional view illustrating materials used to form the cutting element of FIG. 1 in a container in preparation for subjecting the container to an HPHT sintering process.

Referring to FIG. 3, diamond particles 116 may be positioned within a container 118 (e.g., a metal canister). The diamond particles 116 may include grains or crystals of diamond (e.g., diamond grit), which will ultimately form the diamond grains 106, 108 in the sintered polycrystalline diamond 102 (FIG. 2). A gas 114 also may be present in the spaces between the diamond particles 116 in the container 118. The gas 114 may include carbon monoxide and carbon dioxide, and may optionally include one or more additional components, such as an inert gas (e.g., argon, helium, nitrogen, etc.). The gas 114 may be selected to be substantially free of water, oxygen, halogens, or other reactive (e.g., oxidizing) compounds.

As shown in FIG. 3, the container 118 may include an inner cup 120 in which the diamond particles 116 and the gas 114 may be provided. If the cutting element 100 is to include a substrate 104, the substrate 104 optionally may also be provided in the inner cup 120 over or under the diamond particles 116 and the gas 114, and may ultimately be encapsulated in the container 118. The container 118 may further include a top cover 122 and a bottom cover 124, which may be assembled and bonded together (e.g., swage bonded) around the inner cup 120 with the diamond particles 116, the gas 114, and the optional substrate 104 therein.

In the container 118, the diamond particles 116 may have a packing fraction from about 45% to about 99% (i.e., with a void space of between about 55% and about 1% of the total volume), such as from about 50% to about 70% (i.e., with a void space of between about 50% and about 30% of the total volume). The gas 114 may occupy the void space between the diamond particles 116, such that the gas 114 is in proximity to the diamond particles 116. For example, the gas 114 may substantially fill the void space between the diamond particles 116. The mass of the gas 114 may depend on the temperature and/or pressure of the materials in the container 118. For example, the mass of the gas 114 occupying the void space between the diamond particles 116 may increase in direct proportion to pressure and inversely in proportion to absolute temperature.

The gas 114 may be formulated to react with and consume graphite at a faster rate than the gas 114 reacts with diamond at HTHP conditions. For example, if the gas 114 includes carbon monoxide and carbon dioxide, the gas 114 and solid carbon may tend toward equilibrium as defined by the Boudouard reaction, $C_{(s)} + CO_{2(g)} \leftrightarrow 2CO_{(g)}$, in which carbon dioxide ($CO_2$) gas oxidizes solid carbon to form carbon monoxide (CO) gas. The reaction equilibrium constant $K_{eq}$ of the Boudouard reaction is defined as $$K_{eq} = \frac{[CO]^2}{a_c \times [CO_2]},$$

where [CO] is the concentration of carbon monoxide, [$CO_2$] is the concentration of carbon dioxide, and $a_c$ is the activity of carbon (activity is approximately 1 for solids at relevant conditions). $K_{eq}$ varies based on the temperature of the system. Because carbon monoxide and carbon dioxide are gases, a pressure-based reaction equilibrium can be expressed as $$K_p = \frac{P_{CO}^2}{a_c \times P_{CO_2}},$$

where $P_{CO}$ is the partial pressure of carbon monoxide and $P_{CO_2}$ is the partial pressure of carbon dioxide. $K_p$ varies based on the temperature and pressure of the system. Furthermore, both $K_{eq}$ and $K_p$ vary based on the form of the solid carbon formed or consumed.

Figure 4:
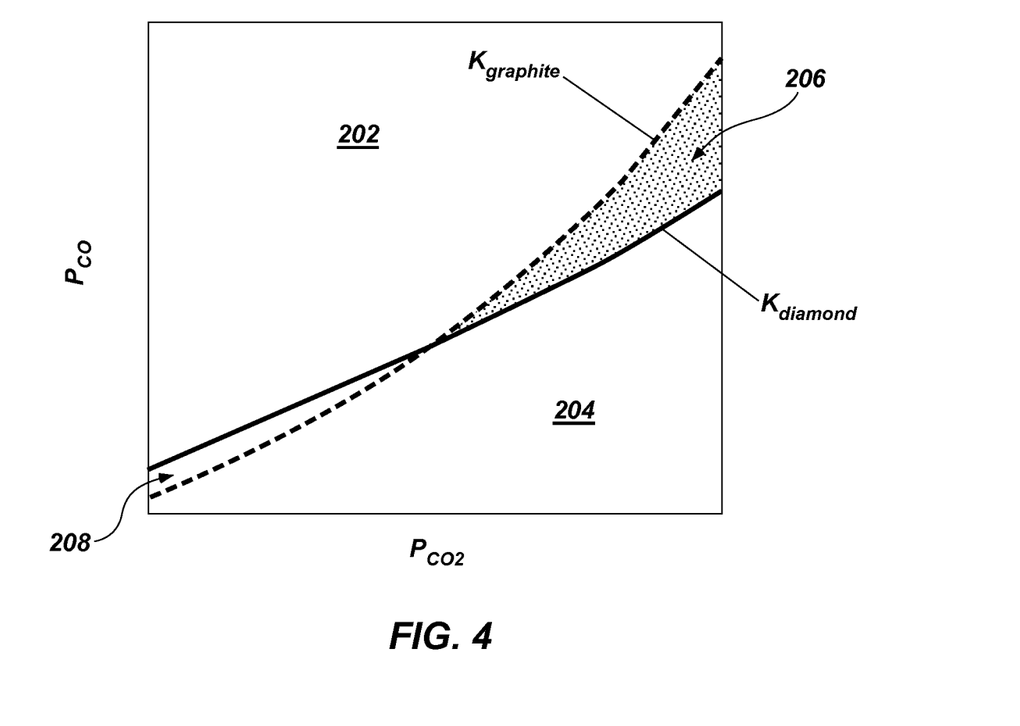
FIG. 4 is a plot illustrating how pressure-based equilibrium constants $K_p$ for the reaction between solid carbon, carbon monoxide, and carbon dioxide may vary with pressure at a selected temperature.

FIG. 4 illustrates how $K_p$ varies with pressure for a given temperature. $K_p$ curves are shown for graphite and diamond. The area of FIG. 4 is divided into four regions, with each point having coordinates defined by a partial pressure of carbon dioxide (x-axis) and a partial pressure of carbon monoxide (y-axis). The first region 202, above both $K_p$ curves, corresponds to partial pressures at which carbon monoxide reacts to form solid carbon (graphite and/or diamond) and carbon dioxide. The second region 204 in FIG. 4, below both $K_p$ curves, corresponds to partial pressures at which carbon dioxide reacts with solid carbon (graphite and/or diamond) to form carbon monoxide. The third region 206, above the $K_p$ curve for diamond but below the $K_p$ curve for graphite, corresponds to partial pressures at which carbon dioxide reacts with graphite to form carbon monoxide and carbon monoxide reacts to form carbon dioxide and diamond. The fourth region 208, above the $K_p$ curve for graphite but below the $K_p$ curve for diamond, corresponds to partial pressures at which carbon dioxide reacts with diamond to form carbon monoxide and carbon monoxide reacts to faun carbon dioxide and graphite.

The boundaries of the third region 206, in which carbon dioxide reacts with graphite to form carbon monoxide and carbon monoxide reacts to form carbon dioxide and diamond, vary depending on temperature and the fraction of inert gases present. For example, at a temperature of about 2000 K (1727° C.) and in the presence of about 5% inert gases, the third region 206 may include $CO_2$ partial pressures above about 5.0 GPa and CO partial pressures above about $1.3 \times 10^{-3}$ GPa. Thus, the ratio of $CO:CO_2$ may be approximately $2.6 \times 10^{-3}$. Appropriate ranges for the ratio of $CO:CO_2$ vary based on HPHT conditions, but may be, for example, less than about $5.0 \times 10^{-3}$, such as from about $2.0 \times 10^{-3}$ to about $5.0 \times 10^{-3}$, or from about $3.0 \times 10^{-3}$ to about $5.0-10^{-3}$. For example, partial pressures of $CO_2$ and CO may each be selected to be at least at the partial pressures shown in Table 1 below at a given temperature. The partial pressures shown in Table 1 correspond to calculated minimum partial pressures for diamond stability. The points in the third region 206 may correspond to pressures at least as high as the values shown in Table 1.

TABLE 1

Calculated minimum partial pressures for diamond stability

| T (° C.) | $P_{CO_2}$ (GPa) | $P_{CO}$ (GPa) | $P_{CO}/P_{CO_2}$ |
|---|---|---|---|
| 500 | 1.9 | $2.3 \times 10^{-4}$ | $1.2 \times 10^{-4}$ |
| 1000 | 3.0 | $9.0 \times 10^{-4}$ | $3.0 \times 10^{-4}$ |
| 1400 | 3.9 | $2.7 \times 10^{-3}$ | $6.9 \times 10^{-4}$ |
| 1600 | 4.4 | $4.6 \times 10^{-3}$ | $1.1 \times 10^{-3}$ |
| 1800 | 4.8 | $8.2 \times 10^{-3}$ | $1.7 \times 10^{-3}$ |
| 2000 | 5.3 | $1.4 \times 10^{-2}$ | $2.6 \times 10^{-3}$ |
| 3000 | 7.4 | $2.3 \times 10^{-1}$ | $3.1 \times 10^{-2}$ |

Sintering at partial pressures within the third region 206 appears to cause carbon dioxide to selectively consume graphite without consuming diamond. Without being bound to any particular theory, this process appears to clean, scavenge, or remove graphite from the surface of diamond grains, and may cause additional diamond material to form on the diamond grains. Adjacent diamond grains may then bond directly to one another, aided by the pressure and temperature of the HTHP sintering process, without the interference of graphite. Deposition of diamond from the oxidation of carbon monoxide may enhance bonding between grains without use of a metal catalyst. By excluding metal catalysts from the process, a cutting element 100 (FIG. 1) so formed may be less susceptible to thermal damage and reverse graphitization.

In a closed system, such as the container 118 shown in FIG. 3, the amount of solid carbon that may be consumed or converted to another form by reaction with carbon dioxide may be stoichiometrically limited by the amount of carbon dioxide present when the container 118 is sealed. Thus, the amount of graphite that may be oxidized (or scavenged) may be determined by the volume of gas 114, the amount of inert gases (if any), the pressure in the container 118, and the temperature.

As described herein, the gas 114 may be provided as a gas into a container 118 (e.g., into the inner cup 120 of the container 118) in which diamond particles 116 are present. The container 118 may then be sealed with the diamond particles 116 and the gas 114 therein. The sealed container 118 may be subjected to an HPHT process to form the polycrystalline diamond 102. The gas 114 may be introduced after performing one or more vacuum purification processes (e.g., after exposing the diamond particles 116 and/or the container 118 to one or more vacuum purge processes to remove other gaseous or volatile compounds). The gas 114 may also be introduced into the container 118 under pressure, such that the concentration of the gas 114 is selectively controlled prior to sealing the container 118 and subjecting the sealed container 118 to HPHT conditions. In other words, by selectively controlling the pressure of the gas 114, the concentration of the components thereof in the sealed container 118 also may be selectively controlled. In some embodiments, the pressure of the gas 114 may be at least about 10 kPa, at least about 100 kPa, at least about 1000 kPa (1.0 MPa), at least about 10 MPa, at least about 100 MPa, or even at least about 500 MPa. Similarly, the temperature of the gas 114 and the container 118 may be selectively controlled prior to sealing the container 118 and subjecting the sealed container 118 to HPHT conditions.

Figure 5A:
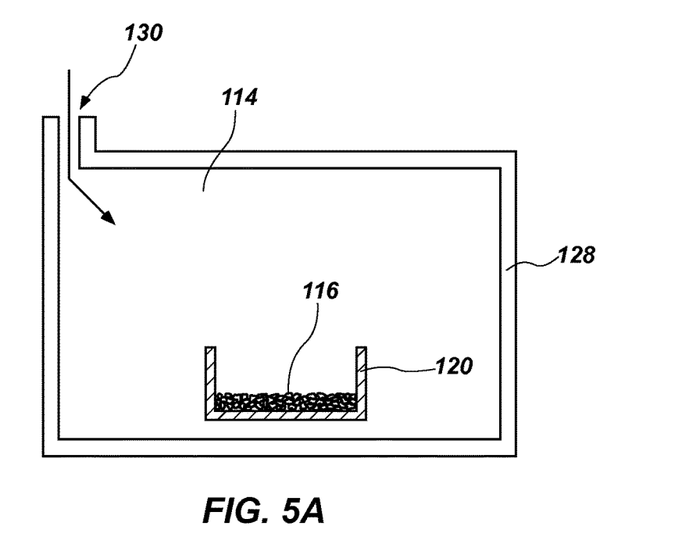
FIGS. 5A and 5B illustrate the materials of FIG. 3 being encapsulated in the container of FIG. 3 in a gaseous environment comprising a carbon monoxide and carbon dioxide within an enclosed chamber.

FIG. 5A illustrates diamond particles 116 disposed within an inner cup 120 of the container 118 (FIG. 3) in an enclosed chamber 128. The chamber 128 may be, for example, a glove box configured to allow manipulation of the inner cup 120 and other items by an operator. The chamber 128 may, in some embodiments, contain mechanical means for manipulating items (e.g., robotic arms). As discussed above with respect to FIG. 2, the diamond particles 116 may have a monomodal or multimodal grain size distribution. For example, the diamond particles 116 may include micron diamond particles, submicron diamond particles, and/or diamond nanoparticles. Before the HPHT process, the diamond particles 116 that ultimately will form the diamond grains 106, 108 of the polycrystalline diamond 102 may be subjected to treatments under vacuum to reduce impurities. After this purification process, gas 114 can be introduced into the purified diamond particles 116.

The gas 114 may be introduced into the chamber 128 through an inlet 130, as illustrated by the directional arrow in FIG. 5A. The pressure of the gas 114 within the enclosed chamber 128 may be selectively controlled (e.g., increased) to control the amount of the gas 114 to be encapsulated within the container 118 (FIG. 3). For example, the pressure of the gas 114 within the chamber 128 may be at least about 10 kPa, at least about 100 kPa, at least about 1000 kPa (1.0 MPa), at least about 10 MPa, at least about 100 MPa, or even at least about 500 MPa. In some embodiments, the gas 114 may be maintained at a pressure near ambient pressure, such that a flexible chamber 128 may be used to manipulate the container 118.

The gas 114 may be introduced in one or more steps. For example, carbon monoxide may be first introduced into the chamber 128 to a first selected total pressure. Carbon dioxide may be subsequently introduced into the chamber 128 to a second selected total pressure (e.g., the sum of the partial pressure of carbon monoxide and the partial pressure of carbon dioxide). Another gas (e.g., argon) may then be introduced into the chamber 128 to a third selected total pressure (e.g., the sum of the partial pressure of carbon monoxide, the partial pressure of carbon dioxide, and the partial pressure of argon). The gases may be introduced in any selected order, or as one or more mixtures. The ratio of the concentration of the gases to one another may be controlled by controlling the pressure within the chamber 128 during introduction of the various gases.

Figure 5B:
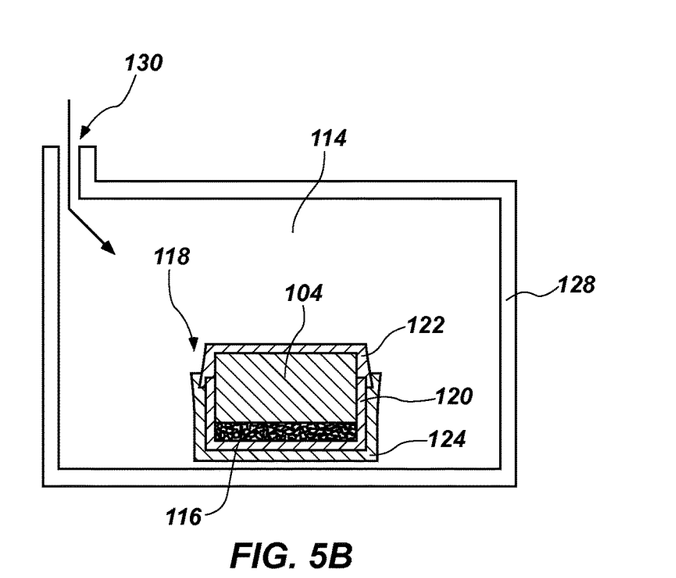

Referring to FIG. 5B, the container 118 may be assembled within the chamber 128 to encapsulate the diamond particles 116 and the gas 114 within the container 118. The container 118 may be sealed to keep the composition of the gas 114 therein fixed. The sealed container 118 then may be subjected to HPHT processing, as known in the art and not described in detail herein.

Cutting elements 100 (FIG. 1) formed as disclosed herein may exhibit desirable properties. For example, the polycrystalline diamond 102 of cutting elements 100 may be substantially free of metal and metallic compounds without the need to perform a leaching process thereon. Furthermore, the polycrystalline diamond 102 may be substantially free of graphitic carbon. The polycrystalline diamond 102 may exhibit a density of at least 95% of the theoretical maximum density of diamond, at least 98% of the theoretical maximum density of diamond, at least 99% of the theoretical maximum density of diamond, or even at least 99.9% of the theoretical maximum density of diamond. The polycrystalline diamond 102 may exhibit an elastic modulus of, for example, at least about 1000 GPa or at least about 1100 GPa.

Figure 6:
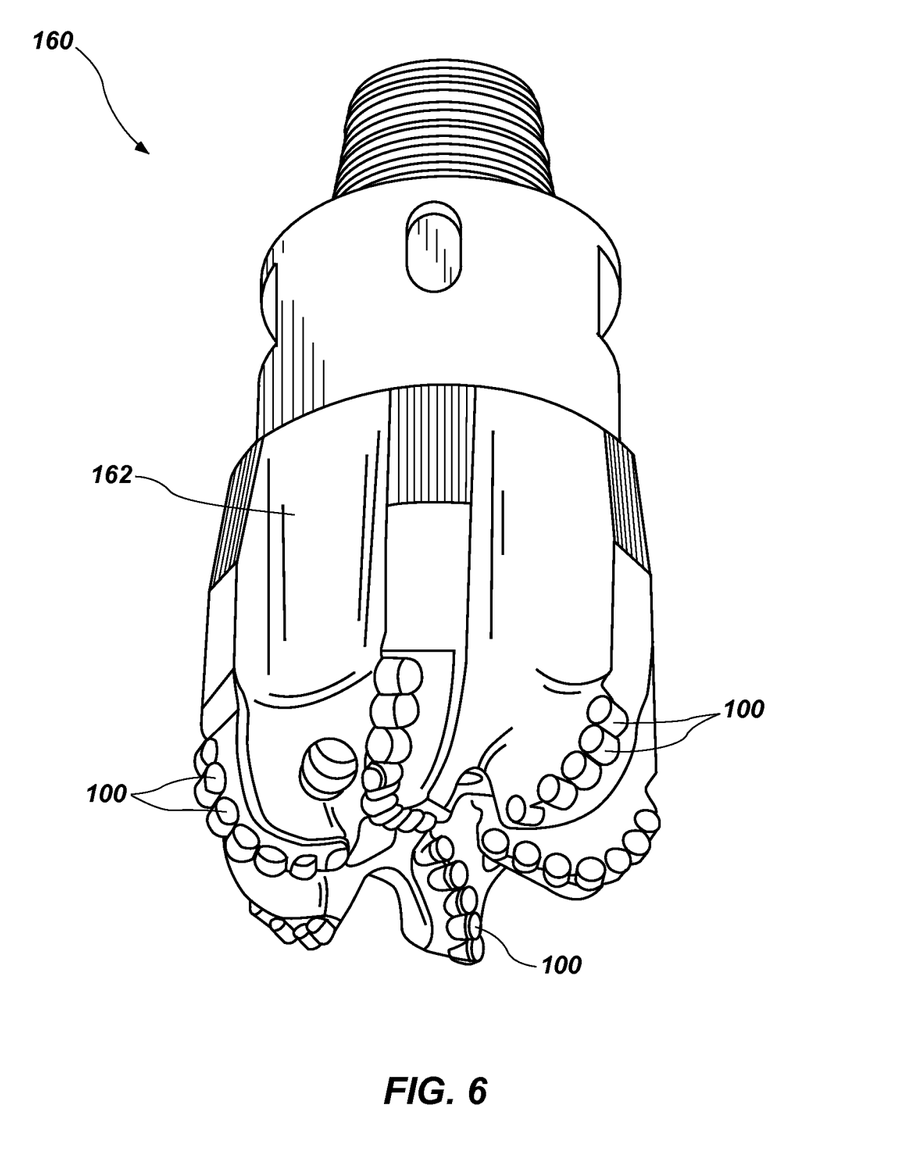
FIG. 6 illustrates an earth-boring rotary drill bit comprising polycrystalline diamond cutting elements as described herein.

Embodiments of cutting elements 100 (FIG. 1) that include polycrystalline diamond 102 fabricated as described herein may be mounted to earth-boring tools and used to remove subterranean formation material. FIG. 6 illustrates a fixed-cutter earth-boring rotary drill bit 160. The drill bit 160 includes a bit body 162. One or more cutting elements 100 as described herein may be mounted on the bit body 162 of the drill bit 160. The cutting elements 100 may be brazed or otherwise secured within pockets formed in the outer surface of the bit body 162. Other types of earth-boring tools, such as roller cone bits, percussion bits, hybrid bits, reamers, etc., also may include cutting elements 100 as described herein.

EXAMPLES

Example 1

95% $CO_2$ at 101 kPa

Approximately 2.0 grams of diamond grit is placed into a container having an internal volume of 20 $cm^3$ (e.g., the inner cup 120 shown in FIG. 3). The diamond grit may have any selected particle size distribution or other property as known in the art of PCD fabrication. The container is placed in a pressurizable glove box or chamber suitable for both vacuum and gas injection (e.g., the chamber 128 shown in FIG. 5A). The chamber is then sealed to isolate the diamond grit from ambient atmosphere.

Gas is removed from the chamber by a vacuum pump until the absolute pressure in the chamber is less than or equal to 20 mTorr (2.7 Pa). An argon supply passes through a scrubber to remove $O_2$ and $H_2O$, and provides approximately 99.9999% purity Ar to the chamber until the pressure in the chamber is between about 3 psig (122 kPa absolute pressure) and about 15 psig (204 kPa absolute pressure). This cycle of removing gas and purging with Ar is repeated two additional times. Gas is removed from the chamber a fourth time until the absolute pressure in the chamber is less than or equal to 20 mTorr (2.7 Pa).

Carbon monoxide (CO) gas is provided through a scrubber to the chamber until the pressure in the chamber reaches about 280.9 Pa, at which time the flow of CO is stopped. The chamber contains a partial pressure of Ar of about 2.7 Pa and partial pressure of CO of about 278.2 Pa. Additional Ar is provided through a scrubber to the chamber until the pressure in the chamber reaches about 5066 Pa, at which time the flow of CO is stopped. The chamber contains a partial pressure of Ar of about 4788 Pa and partial pressure of CO of about 278.2 Pa. Carbon dioxide ($CO_2$) gas is provided through a scrubber to the chamber until the pressure in the chamber reaches about 101.3 kPa, at which time the flow of $CO_2$ is stopped. The chamber contains a partial pressure of $CO_2$ of about 96.26 kPa, a partial pressure of Ar of about 4788 Pa, and partial pressure of CO of about 278.2 Pa. The ratio of $CO:CO_2$ in the chamber is approximately $2.9 \times 10^{-3}$. By providing the gases in increasing order of desired final partial pressures, the amount of the lower-pressure gases may be more precisely controlled.

The container is sealed with the diamond grit and gases inside. For example, for the container 118 shown in FIG. 3, the top cover 122 may be a pre-fabricated niobium cover with a precision machined (or ground) interior sized to fit over the inner cup 120 when heated. The top cover 122 may be heated to expand the material thereof, and a thin layer of high-temperature sealant may be applied to a surface of the top cover 122. The top cover 122 may then be placed over the inner cup 120 such that a seal forms between the side wall of the inner cup 120 and the side wall of the top cover 122. After the container 118 cools, the container 118 may be pressed to further seat the cap if desired.

In some embodiments, a two-step process may be used for sealing the container 118. For example, a layer of gas-tight sealing adhesive may be applied to a flat or preformed cover (e.g., top cover 122). The flat or preformed cover may be placed on the base container to allow the adhesive to seal. A weight may be applied on the flat or preformed cover to apply extra pressure. Once the adhesive has cured, the weight may be removed from the cover. Additional sealing adhesive may be applied around the upper perimeter of the inner cup 120. The flat or preformed cover may be manually pressed with a die to form smooth and uniform sides adhering to the base container wall with an interface of sealing compound.

In other embodiments, the container 118 may be sealed by exposing a portion of the container 118 to laser irradiation. For example, a focused beam may be directed near an interface between the top cover 122 and the inner cup 120 to weld top cover 122 to inner cup 120 along a peripheral interface.

After the container 118 is sealed, the container 118 with the diamond and gases inside is subjected to HPHT processing. For example, the container 118 may be placed in a belt or cube type press with a graphite heater. In some embodiments, the container 118 may be subjected to a temperature of at least about 1400° C. and a pressure of at least 4.5 GPa, such as a temperature of at least about 1500° C. and a pressure of at least about 6.0 GPa, or even a temperature of at least about 1700° C. and a pressure of at least about 8.0 GPa. In general, higher temperatures and pressures cause higher density of the resulting polycrystalline diamond 102.

Thermodynamic calculations suggest that when the diamond grit and gases described in this example are subjected to HPHT sintering at 1727° C. and 8 GPa, approximately 0.50% by weight of the carbon material in the container 118 (i.e., about 0.01 g of the 2.0 g of carbon) may be reacted with $CO_2$ in the Boudouard Reaction to form CO.

Example 2

50% $CO_2$ at 101 kPa

Approximately 2.0 grams of diamond grit is placed into a container having an internal volume of 20 cm³ (e.g., the inner cup 120 shown in FIG. 3). The diamond grit may have any selected particle size distribution or other property as known in the art of PCD fabrication. The container is placed in a pressurizable glove box or chamber suitable for both vacuum and gas injection (e.g., the chamber 128 shown in FIG. 5A). The chamber is then sealed to isolate the diamond grit from ambient atmosphere.

Gas is removed from the chamber via a vacuum pump until the absolute pressure in the chamber is approximately 20 mTorr (2.7 Pa). An argon supply passes through a scrubber to remove $O_2$ and $H_2O$ and provides approximately 99.9999% purity Ar to the chamber until the pressure in the chamber is between about 3 psig (122 kPa absolute pressure) and about 15 psig (204 kPa absolute pressure). This cycle of removing gas and purging with Ar is repeated two additional times. Gas is removed from the chamber a fourth time until the absolute pressure in the chamber is approximately 20 mTorr (2.7 Pa).

CO gas is provided through a scrubber to the chamber until the pressure in the chamber reaches about 202.8 Pa, at which time the flow of CO is stopped. The chamber contains a partial pressure of Ar of about 2.7 Pa and partial pressure of CO of about 200.1 Pa. $CO_2$ is provided through a scrubber to the chamber until the pressure in the chamber reaches about 50.66 kPa, at which time the flow of $CO_2$ is stopped. The chamber contains a partial pressure of $CO_2$ of about 50.46 kPa, a partial pressure of CO of about 200.1 Pa, and a partial pressure of Ar of about 2.7 Pa. Ar gas is provided through a scrubber to the chamber until the pressure in the chamber reaches about 101.3 kPa, at which time the flow of Ar is stopped. The chamber contains a partial pressure of $CO_2$ of about 50.66 kPa, a partial pressure of Ar of about 50.46 Pa, and partial pressure of CO of about 200.1 Pa. The ratio of $CO:CO_2$ in the chamber is approximately $4.0 \times 10^{-3}$.

The container 118 with the diamond and gases inside is subjected to HPHT processing, as described in Example 1, above. Thermodynamic calculations suggest that when the diamond grit and gases described in this example are subjected to HPHT sintering at 1727° C. and 8 GPa, approximately 0.25% by weight of the carbon material in the container 118 (i.e., about 0.005 g of the 2.0 g of carbon) may be reacted with $CO_2$ in the Boudouard Reaction to form CO.

Additional non limiting example embodiments of the disclosure are described below.

Embodiment 1: A method of forming polycrystalline diamond, comprising encapsulating diamond particles, carbon monoxide, and carbon dioxide in a container; and subjecting the encapsulated diamond particles, carbon monoxide, and carbon dioxide to a pressure of at least 4.5 GPa and a temperature of at least 1400° C. to form inter-granular bonds between the diamond particles.

Embodiment 2: The method of Embodiment 1, wherein encapsulating diamond particles, carbon monoxide, and carbon dioxide in a container comprises encapsulating diamond particles, carbon monoxide, carbon dioxide, and an inert gas in a container.

Embodiment 3: The method of Embodiment 1 or Embodiment 2, wherein encapsulating diamond particles, carbon monoxide, and carbon dioxide in a container further comprises removing at least one of oxygen and water from the container.

Embodiment 4: The method of any of Embodiments 1 through 3, wherein encapsulating diamond particles, carbon monoxide, and carbon dioxide in a container comprises encapsulating diamond particles, carbon monoxide, carbon dioxide, and a substrate in a container.

Embodiment 5: The method of any of Embodiments 1 through 4, wherein subjecting the encapsulated diamond particles, carbon monoxide, and carbon dioxide to a pressure of at least 4.5 GPa and a temperature of at least 1400° C. comprises preferentially oxidizing graphite from the diamond particles.

Embodiment 6: The method of Embodiment 5, wherein preferentially oxidizing graphite from the diamond particles comprises converting graphite to carbon monoxide.

Embodiment 7: The method of any of Embodiments 1 through 6, further comprising converting at least a portion of the carbon monoxide to diamond.

Embodiment 8: The method of any of Embodiments 1 through 7, wherein encapsulating diamond particles, carbon monoxide, and carbon dioxide in a container comprises placing the diamond particles in the container; positioning the container with the diamond particles therein in an environment comprising carbon monoxide and carbon dioxide; and sealing the container in the environment comprising the carbon monoxide and carbon dioxide.

Embodiment 9: The method of Embodiment 8, wherein sealing the container in the environment comprising the carbon monoxide and carbon dioxide comprises exposing at least a portion of the container to laser irradiation.

Embodiment 10: The method of any of Embodiments 1 through 9, further comprising selecting a ratio of a partial pressure of the carbon monoxide to a partial pressure of the carbon dioxide to be about $5.0 \times 10^{-3}$ or lower.

Embodiment 11: The method of Embodiment 10, wherein selecting a ratio of a partial pressure of the carbon monoxide to a partial pressure of the carbon dioxide to be about $5.0 \times 10^{-3}$ or lower comprises selecting a ratio of a partial pressure of the carbon monoxide to a partial pressure of the carbon dioxide to be in a range from about $3.0 \times 10^{-3}$ to about $5.0 \times 10^{-3}$.

Embodiment 12: The method of any of Embodiments 1 through 11, wherein subjecting the encapsulated diamond particles, carbon monoxide, and carbon dioxide to a pressure of at least 4.5 GPa and a temperature of at least 1400° C. comprises subjecting the encapsulated diamond particles, carbon monoxide, and carbon dioxide to conditions at which a reaction quotient is less than an equilibrium constant for oxidation of graphite and greater than an equilibrium constant for oxidation of diamond. The reaction quotient is defined as $$\frac{P_{CO}^2}{a_c \times P_{CO_2}}.$$

The equilibrium constant for oxidation of graphite is defined as $$\frac{[CO]^2}{a_c \times [CO_2]}$$

for a mass of materials comprising solid graphite, gaseous carbon monoxide, and gaseous carbon dioxide in which no net change occurs in the mass of the solid graphite, the gaseous carbon monoxide, or the gaseous carbon dioxide. The equilibrium constant for oxidation of diamond is defined as $$\frac{[CO]^2}{a_c \times [CO_2]}$$

for a mass of materials comprising solid diamond, gaseous carbon monoxide, and gaseous carbon dioxide in which no net change occurs in the mass of the solid diamond, the gaseous carbon monoxide, or the gaseous carbon dioxide.

Embodiment 13: A cutting element for use in an earth boring tool, the cutting element comprising a polycrystalline diamond material formed by a method comprising encapsulating diamond particles, carbon monoxide, and carbon dioxide in a container; and subjecting the encapsulated diamond particles, carbon monoxide, and carbon dioxide to a pressure of at least 4.5 GPa and a temperature of at least 1400° C. to form inter-granular bonds between the diamond particles.

Embodiment 14: The cutting element of Embodiment 13, wherein the polycrystalline diamond material is substantially free of metal.

Embodiment 15: The cutting element of Embodiment 13 or Embodiment 14, wherein the polycrystalline diamond material exhibits a modulus of at least about 1000 GPa.

Embodiment 16: A cutting element comprising polycrystalline diamond material comprising inter-bonded grains of diamond, wherein the polycrystalline diamond material is substantially free of graphitic carbon and metallic compounds, and wherein the polycrystalline diamond material exhibits a density of at least about 3.49 g/cm$^3$ and a modulus of at least about 1000 GPa.

Embodiment 17: The cutting element of Embodiment 16, further comprising a substrate secured to the polycrystalline diamond material.

Embodiment 18: The cutting element of Embodiment 17, wherein the substrate comprises a material having a chemical composition different from a chemical composition of the polycrystalline diamond material.

Embodiment 19: An earth-boring tool comprising the cutting element of any of Embodiments 16 through 18 secured to a body.

Embodiment 20: The earth-boring tool of Embodiment 19, wherein the earth boring tool comprises an earth boring rotary drill bit.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventor. Further, embodiments of the disclosure have utility with different and various types and configurations of tools.

What is claimed is:

1. A method of forming polycrystalline diamond, comprising:
   encapsulating diamond particles, carbon monoxide, and carbon dioxide in a container without the presence of a metal catalyst; and
   subjecting the encapsulated diamond particles, carbon monoxide, and carbon dioxide to a pressure of at least 4.5 GPa and a temperature of at least 1400° C. to form inter-granular bonds between the diamond particles.

2. The method of claim 1, wherein encapsulating diamond particles, carbon monoxide, and carbon dioxide in a container comprises encapsulating diamond particles, carbon monoxide, carbon dioxide, and an inert gas in a container.

3. The method of claim 1, wherein encapsulating diamond particles, carbon monoxide, and carbon dioxide in a container further comprises removing at least one of oxygen and water from the container.

4. The method of claim 1, wherein encapsulating diamond particles, carbon monoxide, and carbon dioxide in a container comprises encapsulating diamond particles, carbon monoxide, carbon dioxide, and a substrate in a container.

5. The method of claim 1, wherein subjecting the encapsulated diamond particles, carbon monoxide, and carbon dioxide to a pressure of at least 4.5 GPa and a temperature of at least 1400° C. comprises preferentially oxidizing graphite from the diamond particles.

6. The method of claim 5, wherein preferentially oxidizing graphite from the diamond particles comprises converting graphite to carbon monoxide.

7. The method of claim 1, further comprising converting at least a portion of the carbon monoxide to diamond to at least partially form the inter-granular bonds.

8. The method of claim 1, wherein encapsulating diamond particles, carbon monoxide, and carbon dioxide in a container comprises:
placing the diamond particles in the container;
positioning the container with the diamond particles therein in an environment comprising carbon monoxide and carbon dioxide; and
sealing the container in the environment comprising the carbon monoxide and carbon dioxide to contain carbon monoxide and carbon dioxide within the sealed container.

9. The method of claim 8, wherein sealing the container in the environment comprising the carbon monoxide and carbon dioxide comprises exposing an interface between portions of the container to laser irradiation to seal the container.

10. The method of claim 1, further comprising selecting a ratio of a partial pressure of the carbon monoxide to a partial pressure of the carbon dioxide to be about $5.0 \times 10^{-3}$ or lower.

11. The method of claim 10, wherein selecting a ratio of a partial pressure of the carbon monoxide to a partial pressure of the carbon dioxide to be about $5.0 \times 10^{-3}$ or lower comprises selecting a ratio of a partial pressure of the carbon monoxide to a partial pressure of the carbon dioxide to be in a range from about $3.0 \times 10^{-3}$ to about $5.0-10^{-3}$.

12. The method of claim 1, wherein subjecting the encapsulated diamond particles, carbon monoxide, and carbon dioxide to a pressure of at least 4.5 GPa and a temperature of at least 1400° C. comprises subjecting the encapsulated diamond particles, carbon monoxide, and carbon dioxide to conditions at which a reaction quotient is less than an equilibrium constant for oxidation of graphite and greater than an equilibrium constant for oxidation of diamond, wherein:
the reaction quotient is defined as $$\frac{P_{CO}^2}{a_c \times P_{CO_2}};$$

the equilibrium constant for oxidation of graphite is defined as $$\frac{[CO]^2}{a_c \times [CO_2]}$$

for a mass of materials comprising solid graphite, gaseous carbon monoxide, and gaseous carbon dioxide in which no net change occurs in the mass of the solid graphite, the gaseous carbon monoxide, or the gaseous carbon dioxide; and
the equilibrium constant for oxidation of diamond is defined as $$\frac{[CO]^2}{a_c \times [CO_2]}$$

for a mass of materials comprising solid diamond, gaseous carbon monoxide, and gaseous carbon dioxide in which no net change occurs in the mass of the solid diamond, the gaseous carbon monoxide, or the gaseous carbon dioxide.

13. A method of forming polycrystalline diamond, comprising:
encapsulating diamond particles, carbon monoxide, and carbon dioxide in a container; and
subjecting the encapsulated diamond particles, carbon monoxide, and carbon dioxide to a pressure of at least 4.5 GPa and a temperature of at least 1400°C. to form inter-granular bonds between the diamond particles and to form a polycrystalline diamond material that is substantially free of graphitic carbon and metallic compounds immediately after the encapsulated diamond particles, carbon monoxide, and carbon dioxide are subjected to a pressure of at least 4.5 GPa and a temperature of at least 1400°C.

14. The method of claim 13, further comprising performing at least one vacuum purification process to at least one of the diamond particles or the container and thereafter introducing at least one pressurized gas into the container.

15. The method of claim 14, wherein introducing the pressurized gas into the container comprises selectively controlling the pressure of the at least one pressurized gas to selectively control a concentration of components in the container.

16. The method of claim 13, further comprising selecting a ratio of a partial pressure of the carbon monoxide to a partial pressure of the carbon dioxide to convert at least a portion of the carbon monoxide to diamond to at least partially form the inter-granular bonds.

17. The method of claim 16, wherein selecting the ratio of the partial pressure of the carbon monoxide to the partial pressure of the carbon dioxide comprises controlling a pressure within the container while introducing the carbon monoxide and the carbon dioxide therein.

18. The method of claim 13, wherein subjecting the encapsulated diamond particles, the carbon monoxide, and the carbon dioxide to a pressure of at least 4.5 GPa and a temperature of at least 1400°C. comprises subjecting the encapsulated diamond particles, the carbon monoxide, and the carbon dioxide to a pressure of at least 6.0 GPa and a temperature of at least 1500°C.

19. The method of claim 13, wherein forming the polycrystalline diamond material comprises sintering the polycrystalline diamond material without using a metal catalyst.

20. The method of claim 13, wherein forming the polycrystalline diamond material comprise forming the polycrystalline diamond material exhibiting a density of at least about 3.49 g/cm$^3$ and a modules of at least about 1000 GPa.

* * * * *

UNITED STATES PATENT AND TRADEMARK OFFICE
CERTIFICATE OF CORRECTION

PATENT NO. : 9,945,185 B2
APPLICATION NO. : 14/291862
DATED : April 17, 2018
INVENTOR(S) : Marc W. Bird It is certified that error appears in the above-identified patent and that said Letters Patent is hereby corrected as shown below:

In the Specification

| | | | |
|---|---|---|---|
| | Column 1, | Line 29, | change "are foamed by" to --are formed by-- |
| | Column 6, | Line 4, | change "to faun carbon" to --to form carbon-- |

In the Claims

| | | | |
|---|---|---|---|
| Claim 20, | Column 14, | Line 65, | change "a modules of" to --a modulus of-- |

Signed and Sealed this
Fifteenth Day of May, 2018

Andrei Iancu
*Director of the United States Patent and Trademark Office*